United States Patent
Yamamoto et al.

[15] 3,687,555
[45] Aug. 29, 1972

[54] PHOTOELECTRIC POLARIZATION ANALYZER

[72] Inventors: Tadaaki Yamamoto; Toshiyuki Kasai, both of Kawasaki, Japan

[73] Assignee: Nippon Kogaku K.K.

[22] Filed: Dec. 23, 1970

[21] Appl. No.: 101,070

[30] Foreign Application Priority Data
Dec. 29, 1969 Japan....................44/123910

[52] U.S. Cl..................................356/114, 250/225
[51] Int. Cl............................................G01n 21/40
[58] Field of Search.............356/114, 115, 117, 119; 250/225

[56] References Cited
UNITED STATES PATENTS

| | | | |
|---|---|---|---|
| 2,409,853 | 10/1946 | Heijn | 356/114 |
| 3,399,591 | 9/1968 | Drougard et al. | 356/115 |
| 3,520,615 | 7/1970 | Smith | 356/114 |
| 3,545,867 | 12/1970 | Rostas | 250/225 |

*Primary Examiner*—William L. Sikes
*Attorney*—Ward, McElhannon, Brooks & Fitzpatrick

[57] ABSTRACT

Photoelectric polarization analyzer of this invention includes polarization system consisting of a linear polarizer or a polarizing orientation oscillating K.D.P. elements, quarter-wave plate and a compensator; an analyzer; another quarter-wave plate provided between the analyzer and a specimen; an electric device for separating two photoelectric signals converted by a photoelectric element from the light transmitted through said other quarter-wave plate into two electric control signals. In the prior art one of the control signals is used to rotate the polarization system for compensating the orientation of the specimen, and the other control signal is used for shifting the compensator for compensating the phase difference. However, in this invention a half-wave plate is interposed between the polarization system and is and the specimen rotatable in a plane perpendicular to the optic axis of the polarization system, and said one of the two signals is applied to the half-wave plate to rotate it instead of rotating the polarization system, which simplifies the structure.

2 Claims, 9 Drawing Figures

PHOTOELECTRIC POLARIZATION ANALYZER

FIELD OF THE INVENTION

This invention relates to a photoelectric polarization analyzer and more particularly to a polarization analyzer capable of measuring two polarization variables of a specimen placed in an arbitrary orientation.

DESCRIPTION OF THE PRIOR ART

Figure 1:
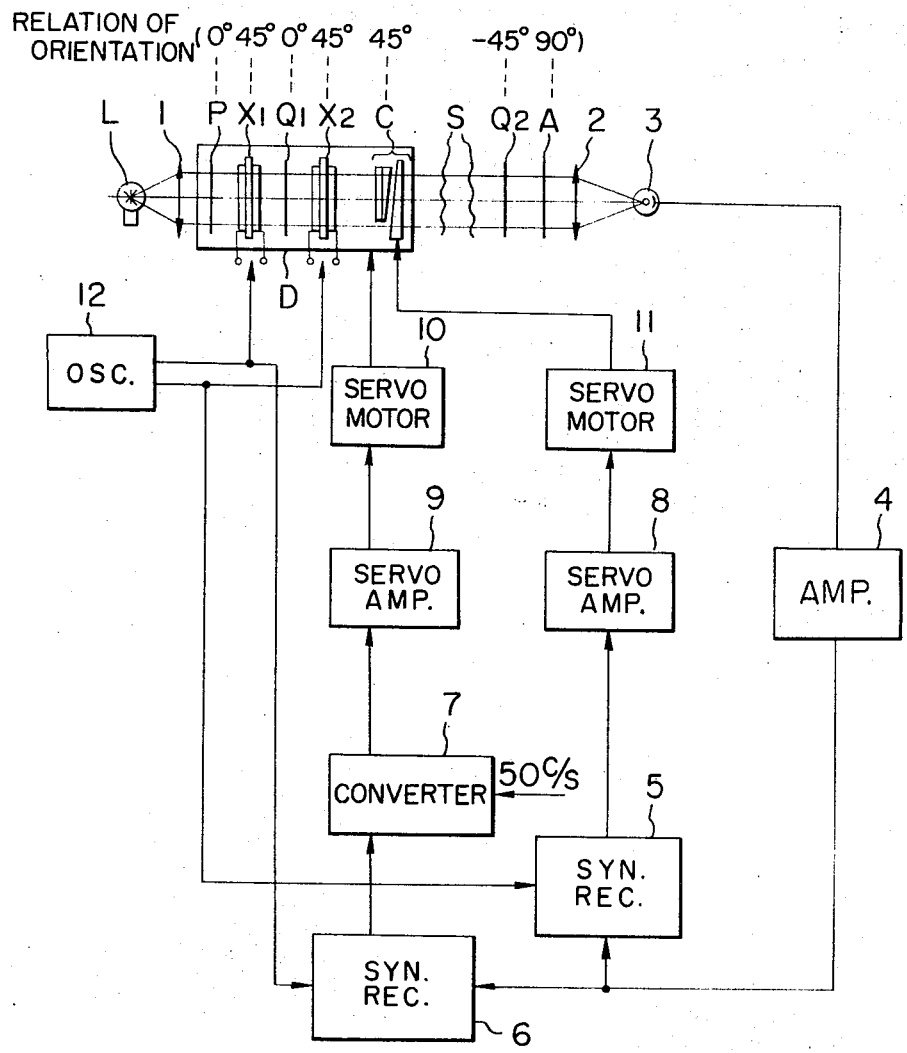
FIG. 1 is a diagrammatic view for explaining the prior art photoelectric polarization analyzer.

The prior art polarization analyzer shown in FIG. 1 has a polarization system D comprising at least a linear polarizer P, crystals $X_1$ and $X_2$ such as potassium dihydrogen phosphate (K.D.P.) whose birefringence varies upon application of a voltage, a quarter-wave plate $Q_1$ and a compensator C. The two variables which determine the state of polarization are simultaneously modulated and the polarized light beam is made incident upon a photoelectric tube 3 through a specimen S oriented in an arbitrary direction, a quarter-wave plate $Q_2$ and an analyzer A. Two photoelectrical signals generated in the photoelectric tube 3 may be separated by their phase difference (of 90°). The polarization system D is rotated about its optical axis by one of the separated signals so that the orientation of the specimen may be compensated for while the compensator C in the system D is shifted in response to the other separated signal to thereby compensate for the phase difference of the specimen. Thus, the two variables (orientation and phase difference) of the specimen may be measured by the angle of rotation of the polarization system D and shift of its compensator C. The component parts designated by reference numerals 4 – 12 are also employed in an instrument shown in FIG. 2, which shows a preferred embodiment of the present invention.

In the prior art photoelectric polarization analyzer of the type discussed above, the polarization system D must be rotated in order to compensate for the orientation of the specimen so that the construction inevitably becomes bulky and complex. Therefore, the instrument becomes large in size.

SUMMARY OF THE INVENTION

The primary object of the present invention is to provide a photoelectric polarization analyzer which can eliminate the disadvantages described above.

According to the invention, between the conventional polarizing optical system and the specimen, a half-wave plate is provided which is rotatable in a plane perpendicular to the optical axis of said polarizing optical system so that the structure becomes very simple.

DESCRIPTION OF THE PREFERRED EMBODIMENT

Figure 2:
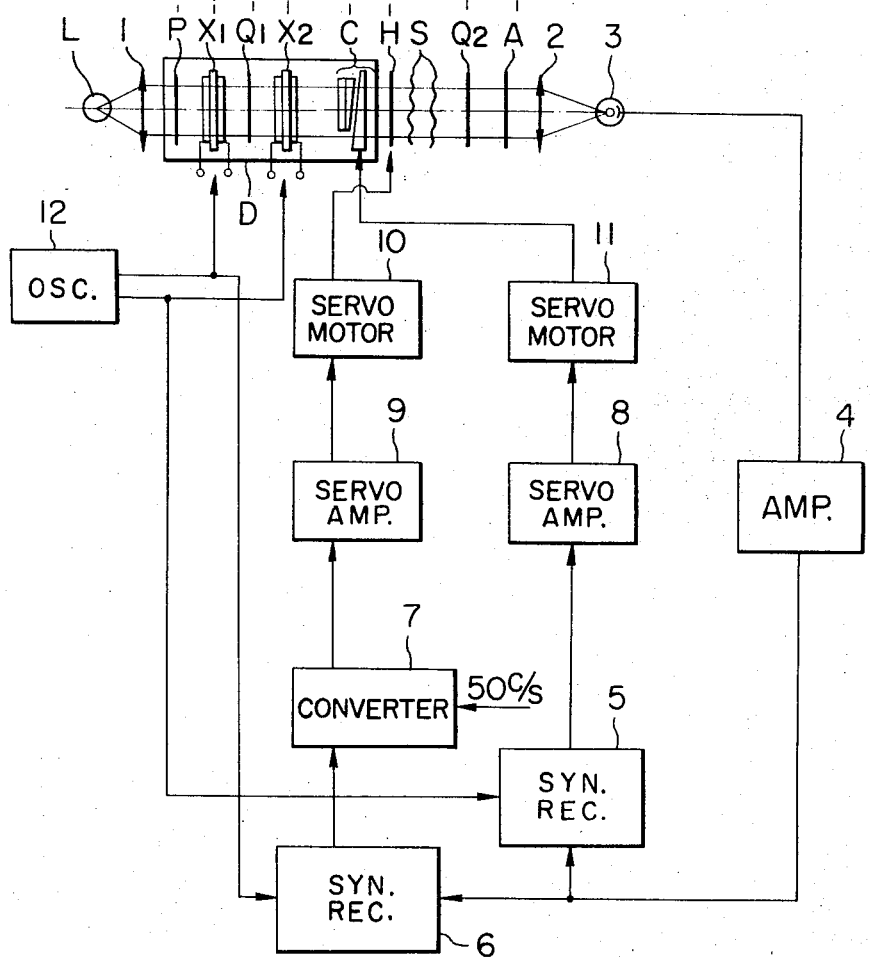
FIG. 2 is a diagrammatic view showing a preferred embodiment in accordance with the present invention.
Figure 3:
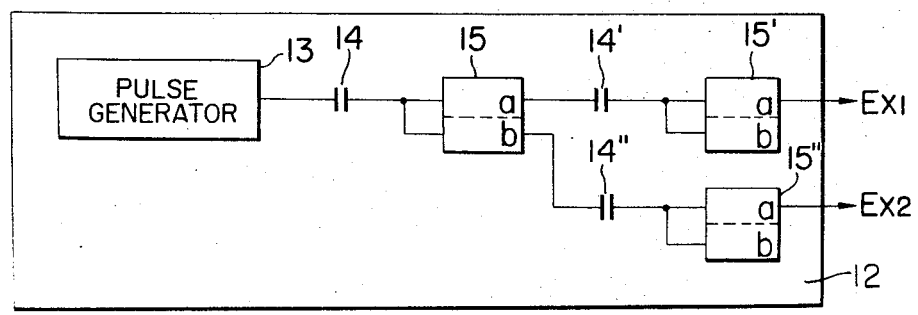
FIG. 3 is a circuit diagram of an oscillator used in the instruments shown in FIGS. 1 and 2.
Figure 4A:
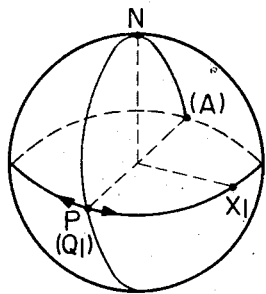
FIGS. 4(a) – 4(f) illustrate Poincare sphere for explanation of the present invention.
Figure 4B:
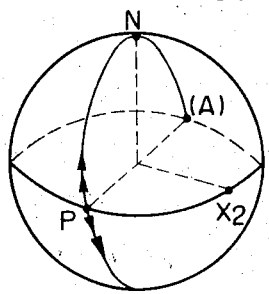
Figure 4C:
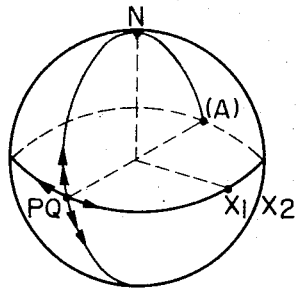
Figure 4D:
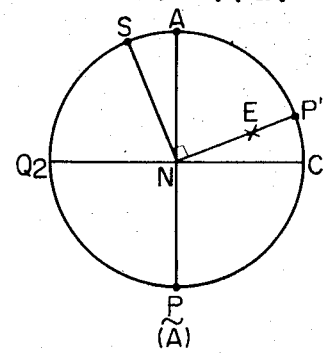
Figure 4E:
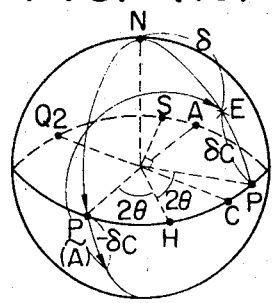
Figure 4F:
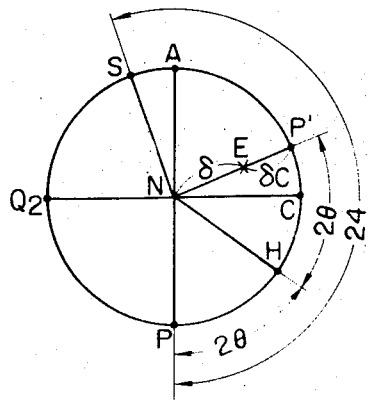

The present invention will become more apparent from the following description of one preferred embodiment thereof taken in conjunction with the accompanying drawing. Referring to FIG. 2, reference character L designates a light source; 1, an illumination system; P, a linear polarizer whose orientation is 0° as a reference orientation for other components; $X_1$, a K.D.P. element whose principal axis is 45° and to which is applied the AC voltage (rectangular wave) $EX_1$ as shown in FIG. 3 from an oscillator 12; $Q_1$ is a quarter-wave plate whose principal axis is 0°. As shown in FIG. 4 - (a) the light represented by the point P on the Poincare sphere is modulated so as to oscillate along the equator. Another K.D.P. element $X_2$ has its principal axis oriented at 45° and to which is applied the AC voltage (square wave) $EX_2$ 90° out of phase with the AC voltage $EX_1$ so that the light represented by the point P in FIG. 4 - (b) may be modulated with respect to the phase difference to thereby make a very small oscillation along a great circle PNA. Thus, as shown in FIG. 4 - (c), the light P is simultaneously subjected to the above two modulations.

A Soleil-Babinet compensator C, whose principal axis is oriented at 45°, is mechanically coupled to a servomotor 11 in order to compensate for the phase difference. The polarization system D comprises a linear polarizer P, a K.D.P. element $X_1$, a quarter-wave plate $Q_1$, another K.D.P. element $X_2$ and the compensator C. A half-wave plate H is mechanically coupled to a servomotor 10 in order to rotate it about the optic axis so as to compensate for the angle of orientation. A specimen S may be placed in any orientation. A quarter-wave plate $Q_2$ has its principal axis oriented at −45°. An analyzer A is oriented at 90°. Reference numeral 2 designates an optical system for observation; 3, a photoelectric tube; and 4, an amplifier for amplifying the photocurrent generated by the photoelectric tube 3. The components of the signals from the amplifier 4, which are in phase with the signals from the oscillator 12, are rectified by synchronous rectifiers 5 and 6. The DC current from the synchronous rectifier 6 is converted into 50 cps AC by a converter 7. Reference numerals 8 and 9 designate servoamplifiers; and 10, the AC servomotor of 50 cps for rotating the half-wave plate H for compensating for the orientation. The servomotor 11 is a DC servomotor coupled to the Soleil-Babinet compensator C for compensating for the phase difference. The oscillator 12 together with components 13–15 as shown in FIG. 3 apply, to the K.D.P. elements $X_1$ and $X_2$, the AC voltages (square waves) $EX_1$ and $EX_2$ which are out of phase by 90°. That is, reference numeral 13 designates a pulse generator 14, 14′ and 14″, capacitors; and 15, 15′ and 15″, bistable multivibrators. The bistable multivibrator 15 is actuated by the signals from the pulse generator 13 through the capacitor 14 so that two outputs, which are out of phase by 180°, are derived. These two outputs or signals are used to actuate the bistable multivibrators 15′ and 15″ through the capacitors 14′ and 14″, respectively, so that two signals, out of phase by 90°, are derived. The device, including the components 4 – 12, will be referred to hereinafter as an "electric separating device."

Next will be described the mode of operation for automatically compensating for the orientation and phase difference of the elliptical polarization when the specimen is orientated at some arbitrary angle. The intensity of light passing through the optical system shown in FIG. 2 is given by the following equation:

$$I = K_1 \left\{ 1 - \cos\left(\delta c + \delta + \frac{\pi}{2} + A \sin wt\right)\right\}$$
$$+ K_2 \left\{ 1 - \cos\left(2\phi - 2\theta - \frac{\pi}{2} + A \cos wt\right)\right\}$$

The fundamental modulated frequency component $I_{fund}$ of the transmitted light is given by the following equation:

$$I_{fund} + K_1 \cos\left(\delta c + \delta + \frac{\pi}{4}\right) 2J_1(A) \sin wt$$
$$+ K_2 \sin\left(2\phi - 2\theta - \frac{\pi}{2}\right) 2J_1(A) \cos wt$$

where $\theta$ = angle of rotation of the $\lambda/2$ plate $H$;
$\sigma$ = phase difference of the specimen;
$\sigma c$ = phase difference of the Soleil-Babinet compensator $C$;
$J_1, A$ = Bessel functions of the first order; and
$K_1, K_2$ = constants. (See FIG. 4 - (f))

That is, the photoelectric signal contains the signal components of sin wt and cos wt. The signal component of sin wt is vanished when $\sigma c = \pi 4 - \sigma$, while the signal component of cos wt is to vanish when $2\theta = 2\phi - \pi/2$.

The signal component of sin wt is vanished by the phase-difference compensation by the Soleil-Babinet compensator C, while the signal component of cos wt is vanished by adjusting the angle of rotation $\theta$ of the $\lambda/2$-plate H. Therefore the signal with the phase of sin wt is applied to the synchronous rectifier 5 by the oscillator 12 so that the rectifier 5 may rectify only the signal component of sin wt out of the photocurrent. Thus the servomotor 11 may compensate for the phase difference by the signal component of sin wt. In a similar manner the oscillator 12 gives the signal with the phase of cos wt, to the synchronous rectifier 6 so that the servomotor 10 may adjust the orientation only by the signal component of cos wt.

The mode of operation will be further described with reference to the Poincare sphere. By following the path of the light, completely vanished by the analyzer A, the polarization of the light, before passing through the specimen S with the phase difference $\sigma$, is given at E. The servomotor 10 rotates the half-wave plate H through a half of an angle between the points P and P' at which the great circle EN containing the point E and the pole N, intersects the equater (up to $2\theta^\circ$), thereby adjusting the orientation. For phase difference compensation, the servomotor 11 rotates the compensator C through $-\sigma c$. Thus, because of the half-wave plate H, the point E is given. The orientation adjustment as well as the phase difference compensation are accomplished simultaneously.

With the structure mentioned above, by orientating the specimen S at some arbitrary angle, and applying A.C. rectangular voltages $EX_1$ and $EX_2$ out of phase by 90°, from the oscillator 12 to K.D.P. elements $X_1$ and $X_2$, respectively, the orientation angle modulation and phase difference modulation are given to the light passing through the linear polarizer P.

The intensity of the transmitted light is converted into photocurrent including two signal components, which are separated and amplified for driving the servomotors 10 and 11. Therefore, the half-wave plate H and the compensator C are rotated to thereby adjust the orientation and compensate for the phase difference, respectively. Thus, the two variables of the polarization may be measured from the adjustment and compensation.

It is seen that, instead of the elements $X_1$ and $X_2$, a substance which brings about the Faraday Effect when subjected to a strong magnetic field may be employed. When K.D.P elements, which can withstand a half-wave voltage are employed, the following variant becomes possible. In addition, instead of the Soleil-Babinet compensator, the K.D.P. element $X_2$ may be employed. The double-refraction phase difference of the K.D.P. element is linearly proportional to the voltage applied so that in addition to the AC voltage, the DC voltage is applied across the K.D.P. element $X_2$ so as to vary the applied voltage to thereby accomplish the phase difference compensation, as is the case of the Soleil-Babinet compensator. In this case, the degree of the phase difference compensation may be measured from the voltage applied. In this method the mechanical error in the phase difference compensation may be eliminated and the construction of the instrument may be made compact in size, because no compensator is employed.

We claim:

1. Photoelectric polarization analyzer for automatically measuring two polarization variables (orientation and phase difference) comprising in combination:

an illuminating optical system (L);

a linear polarizer (P) disposed serially along the optical axis of said illuminating system;

means ($X_1$, $Q_1$) for modulating the orientation of the light passing through said linear polarizer;

means ($X_2$) for modulating a phase difference of the light passing through said linear polarizer;

a phase difference compensator (C) disposed slidably in the normal direction to the optical axis of said illuminating system, the orientation of the principal axis of said phase difference compensator (C) being at 45° with respect to the optical axis of said polarizer;

a half-wave plate (H) disposed rotatably in said optical path and behind said phase difference compensator;

a specimen (S) disposed behind the half-wave plate at arbitral orientation;

a first quater-wave plate ($Q_2$) disposed behind the specimen, the orientation of the principal axis of the first quater-wave plate being at $-45°$ with respect to said linear polarizer;

an analyzer (A) disposed behind the quater-wave plate, the principal axis of the analyzer being at 90° with respect to the principal axis of said linear polarizer;

photoelectric conversion means for converting a photo-signal including two components modulated by said orientation and phase difference modulation means, respectively, into an electric signal including two electric modulation signal components; and an electric control means for dividing said electric signal into said two modulated components, one component thereof being modulated by the rotation of said half-wave plate (H) to compensate for the orientation of the specimen, and the other component being modulated by sliding said phase difference compensator (C), to compensate for the phase difference of the specimen, whereby the orientation and the phase difference of the specimen is automatically measured as the angle of rotation of said half-wave plate and the length of movement of said phase difference compensator.

2. Photoelectric polarization analyzer according to claim 1, wherein said orientation modulation means comprises a first double refraction element ($X_1$) disposed behind said linear polarizer (P) and having an electro-optical effect, the orientation of the principal axis of the first double refraction element being at 45° with respect to the principal axis of said linear polarizer, a second quater-wave plate ($Q_1$) disposed between said first double refraction element and said phase difference modulation means, the orientation of the principal axis of the second quater-wave plate being at 0° or 90° with respect to the principal axis of said linear polarizer;

an oscillator for applying an electric voltage to said first double refraction element; and said phase difference modulation means comprises a second double refraction element ($X_2$) disposed between said second quater-wave plate and said phase difference compensator (C) and having an electro-optical effect, the orientation of the principal axis of the second refraction element ($X_2$) being at 45° with respect to said linear polarizer, and an oscillator for applying to the second double refraction element ($X_2$) an electric voltage whose phase differs by 90° from that of said voltage applied to said first double refraction element ($X_1$).

* * * * *

PO-1050
(5/69)

UNITED STATES PATENT OFFICE
CERTIFICATE OF CORRECTION

Patent No. 3,687,555 : Dated August 29, 1972

Inventor(s) TADAAKI YAMAMOTO and TOSHIYUKI KASAI

It is certified that error appears in the above-identified patent and that said Letters Patent are hereby corrected as shown below:

In the Abstract, lines 16 and 17, which read "between the polarization system and is and the specimen" should read --between the polarization system and the specimen and is--

Signed and sealed this 6th day of March 1973.

(SEAL)
Attest:

EDWARD M.FLETCHER,JR.
Attesting Officer

ROBERT GOTTSCHALK
Commissioner of Patents